United States Patent [19]

Gontowski, Jr.

[11] Patent Number: 4,819,122
[45] Date of Patent: Apr. 4, 1989

[54] OVER-CURRENT TIMER MODULATOR

[75] Inventor: Walter S. Gontowski, Jr., Thompson, Conn.

[73] Assignee: Cherry Semiconductor Corporation, East Greenwich, R.I.

[21] Appl. No.: 34,098

[22] Filed: Apr. 2, 1987

[51] Int. Cl.$^4$ .............................................. H02H 7/10
[52] U.S. Cl. ...................................... 361/93; 361/18; 361/87
[58] Field of Search ...................... 361/93, 94, 18, 87, 361/85, 86, 96, 95; 323/282–285; 363/55, 56, 74

[56] References Cited

U.S. PATENT DOCUMENTS

| 3,914,667 | 10/1975 | Waldron | 361/94 |
| 4,180,842 | 12/1979 | Keeney | 361/94 X |
| 4,236,187 | 11/1980 | Mochizuki et al. | 361/93 X |
| 4,386,384 | 5/1983 | Moran | 361/94 |
| 4,428,016 | 1/1984 | Brarfield | 361/93 X |
| 4,528,608 | 7/1985 | Andersson et al. | 361/18 |
| 4,570,199 | 2/1986 | Morishita et al. | 361/18 |
| 4,631,653 | 12/1986 | Small | |

Primary Examiner—A. D. Pellinen
Assistant Examiner—A. Jonathan Wysocki
Attorney, Agent, or Firm—Robert M. Asher

[57] ABSTRACT

A modulator circuit for providing a modulating signal to the timing circuit in a constant off time current mode controller so as to extend the off time in response to an overload condition. A switch connects the output voltage from a current sense amplifier to the modulator circuit when the current mode controller requests maximum current. An overload condition exists when the voltage from the current sense amplifier exceeds a first threshold. The off time is extended to approach infinity when a second threshold is exceeded.

19 Claims, 2 Drawing Sheets

OVER-CURRENT TIMER MODULATOR

BACKGROUND OF THE INVENTION

The invention is directed to a timer modulator for use with constant off time current mode controllers. In particular, the invention is directed to a circuit for modulating the off time of the current mode controller in response to an overabundance of current.

Current mode control as used in power supply systems operate by monitoring the amount of current flowing in a switching element such as a transistor driving a transformer. When the current flowing in the inductance of that transformer reaches an appropriate amount as demanded by a control signal, the controller turns off the switching element allowing the energy stored in the primary of the transformer to be transferred to the secondary and ultimately to the output of the power supply. An error amplifier compares the output voltage to a fixed reference and produces the control signal that determines the required amount of current to be stored in the primary. The amount of time that the switching element stays off depends on what type of current mode scheme is being used.

The scheme associated with the present invention is classified as the constant off mode. When the current reaches the required peak value, the switching element turns off for a fixed time as determined by a timing circuit. Timing components are selected by the power supply designer to ensure that the switch remains off for the appropriate time.

Under output short circuit conditions though, a problem exists. With the output shorted, the error amp will ask for maximum peak current. Because of the finite propagation delays inherent in the control circuitry, a certain amount of time is required to turn off once the maximum peak current is detected. Thus, more current than required flows in the primary. Since the time that the output switches off is fixed there is no way to reduce the duty cycle under short circuit conditions. This can cause the transformer to saturate and result in possible destruction of the switching element.

It is an objective of this invention to monitor the current in a switching element and to increase the amount of off time in a constant off time current mode controller as a function of the amount of over current during overload conditions.

SUMMARY OF THE INVENTION

The present invention receives an output voltage from the current sense amplifier of the current mode controller. A peak detector is used to sample the peak output voltage from the current sense amplifier. The peak detector is generally off. It is turned on only when a signal from the error amplifier indicates that peak maximum current has been delivered to the transformer primary. A timing voltage is used to set the constant off time. Circuitry is provided for comparing the peak output voltage received from the current sense amplifier with a first threshold. If the peak output voltage exceeds the first threshold the present circuit changes the timing voltage to extend the constant off time of the current mode controller.

The circuit of the present invention advantageously permits a constant off time current mode controller to handle an output short circuit condition.

Other objects and advantages of the invention will become apparent during the following description of the presently preferred embodiment of the invention taken in conjunction with the drawings.

BRIEF DSCRIPTION OF THE DRAWINGS

DETAILED DESCRIPTION OF THE PREFERRED EMBODIMENT

Figure 1:
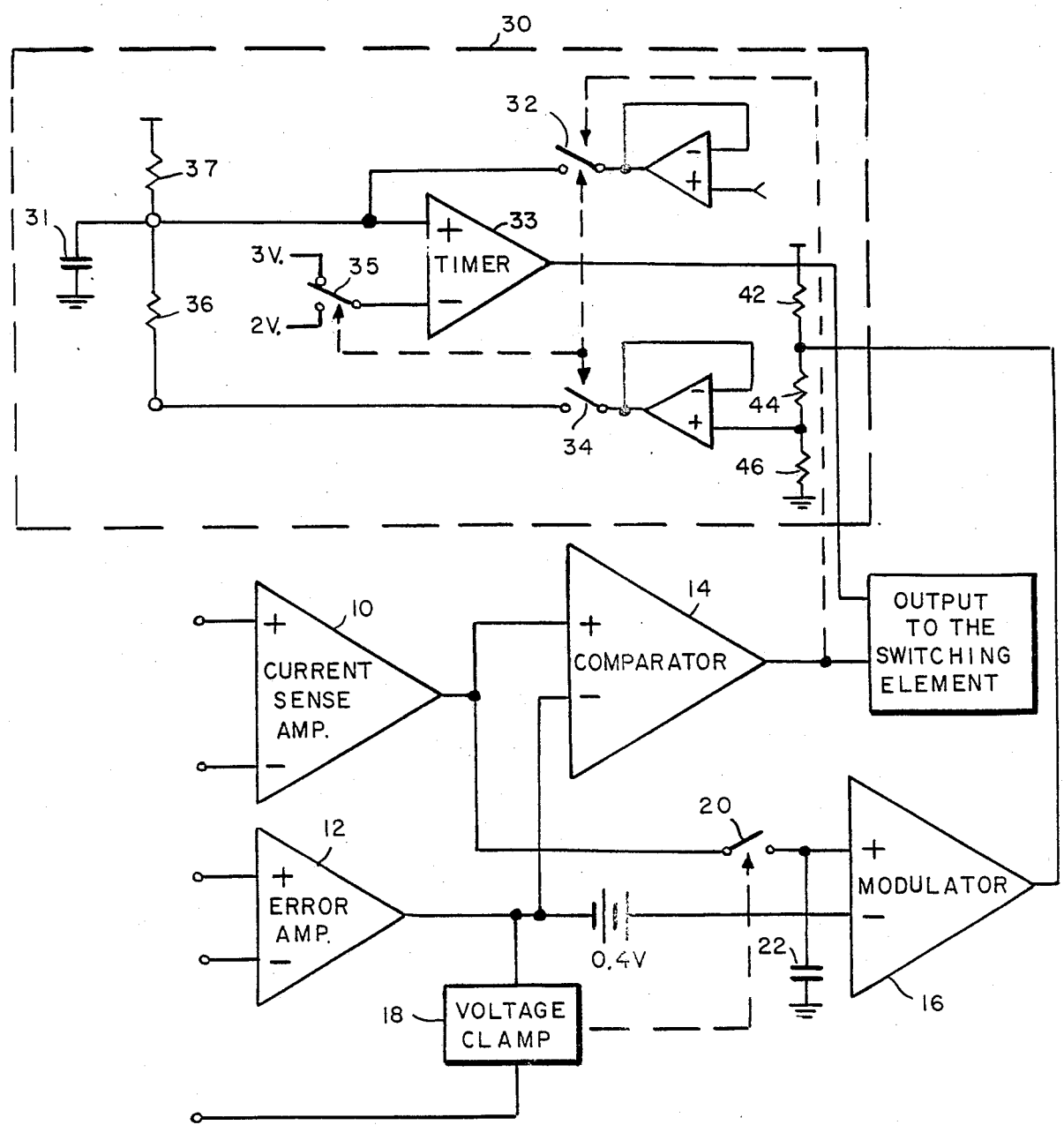
FIG. 1 is a block diagram of the circuit of the present invention.

Turning now to the drawings, FIG. 1 is a block diagram showing the system as operated by the circuit of the present invention. A current sense amplifier 1? of the current mode controller receives a differential voltage proportional to the amount of current flowing in a switching element. This differential voltage is derived from a sensing resistor in series with the switching element. The differential voltage is amplified and supplied to a positive input of a comparator 14 of the current mode controller. An error amplifier 12 of the current mode controller receives a reference voltage and a power supply output. The difference between these voltages develops a control signal that is applied to a negative input of the comparator 14 of the current mode controller. The control signal from the error amplifier 12 is boosted by 0.4 of a volt to set a first threshold. The threshold is applied to an inverting input of a modulator 16 of the present invention.

During regulation, the error amplifier 12 will demand more or less current as a function of the output voltage. If the output voltage decreases, e.g., due to an increase in loading, the control signal demands more current. A voltage clamp 18 in the current mode controller prevents the error amplifier output from exceeding a request for maximum current. The clamp 18 provides a maximum control signal when maximum peak current is requested. The maximum peak current signal is provided to a switch 20 in the present invention which enables the non-inverting input of the modulator 16 to receive the output voltage signal from the current sense amplifier 10.

The maximum off time is determined by a timing block 30. At time equals zero, a timing capacitor 31 starts charging through a charging resistor 37. The switching element of the current mode controller is on. When the monitored current reaches the appropriate level as determined by the comparator 14, comparator 14 changes state and turns off the output to the switching element. The off signal from the comparator 14 also quickly turns on a switch 32 in timing block 30. This quickly charges the timing capacitor 31 toward 4 volts. When the capacitor 31 reaches 3 volts, it is at the top threshold of a timer 33. This causes timer 33 to change state turning switch 32 off, closing switch 34 and switching switch 35 to the lower threshold of 2 volts. The resistor divider network set up by resistor 42, resistor 44, and resistor 46 put one volt through switch 34. Thus, the capacitor 31 is now discharged through resistor 36 at a fixed rate. When the voltage on the timing capacitor 31 drops to 2 volts, the bottom threshold of the timer 33 is reached. The timer 33 switches state opening switch 34 and returning switch 35 to the upper threshold of 3 volts. This is also when timer 33 provides an on-signal to the output. Now the timing capacitor 31 starts charging again through charging resistor 37. The value of timing resistor 37 is chosen along with the value of capacitor 31 to limit the maximum ON time of the output to the switching element. Under normal circumstances, comparator 14 will turn off the switching element before capacitor 31 is charged to 3 volts. If capacitor 31 is charged up to 3 volts before the output is turned off, then timer 33 will turn off the output to the switching element. This is a safety mechanism.

During an overload condition such as a short circuit on a power supply's output terminals, the error amplifier 12 will demand the maximum current available to raise the output voltage. To limit the current to a safe level the voltage clamp 18 limits the error amplifier control signal to a suitable level. During the overload condition, the voltage clamp 18 sends a signal to switch 20 enabling the modulator 16 to receive the current sense amplifier 10 output.

A voltage proportional to the sensed current now appears at the non-inverting input of the modulator 16. The present invention includes a storage capacitor 22 which acts as a peak detector to hold the current sense amplifier output voltage after the switching element has been switched off. This maintains the appropriate peak voltage at the modulator input for producing the modulating voltage signal during the off time. During normal operation, when maximum peak current is not exceeded, the modulator 16 has no effect on the timing circuit. But with an overload condition, the modulator 16 acts as a differential amplifier. It compares the peak output voltage signal from the current sense amplifier lo with the first threshold voltage set at the inverting input by the error amplifier 12. The comparison is used to produce a modulating voltage. This modulating voltagesignal from the modulator 16 is applied to the resistor divider made up of resistors 42, 44, and 46. As the peak output voltage from the current sense amplifier 10 increases above the first threshold voltage the modulating voltage increases. This translates into a higher voltage at switch 34 and subsequently results in a longer off time.

Figure 2:
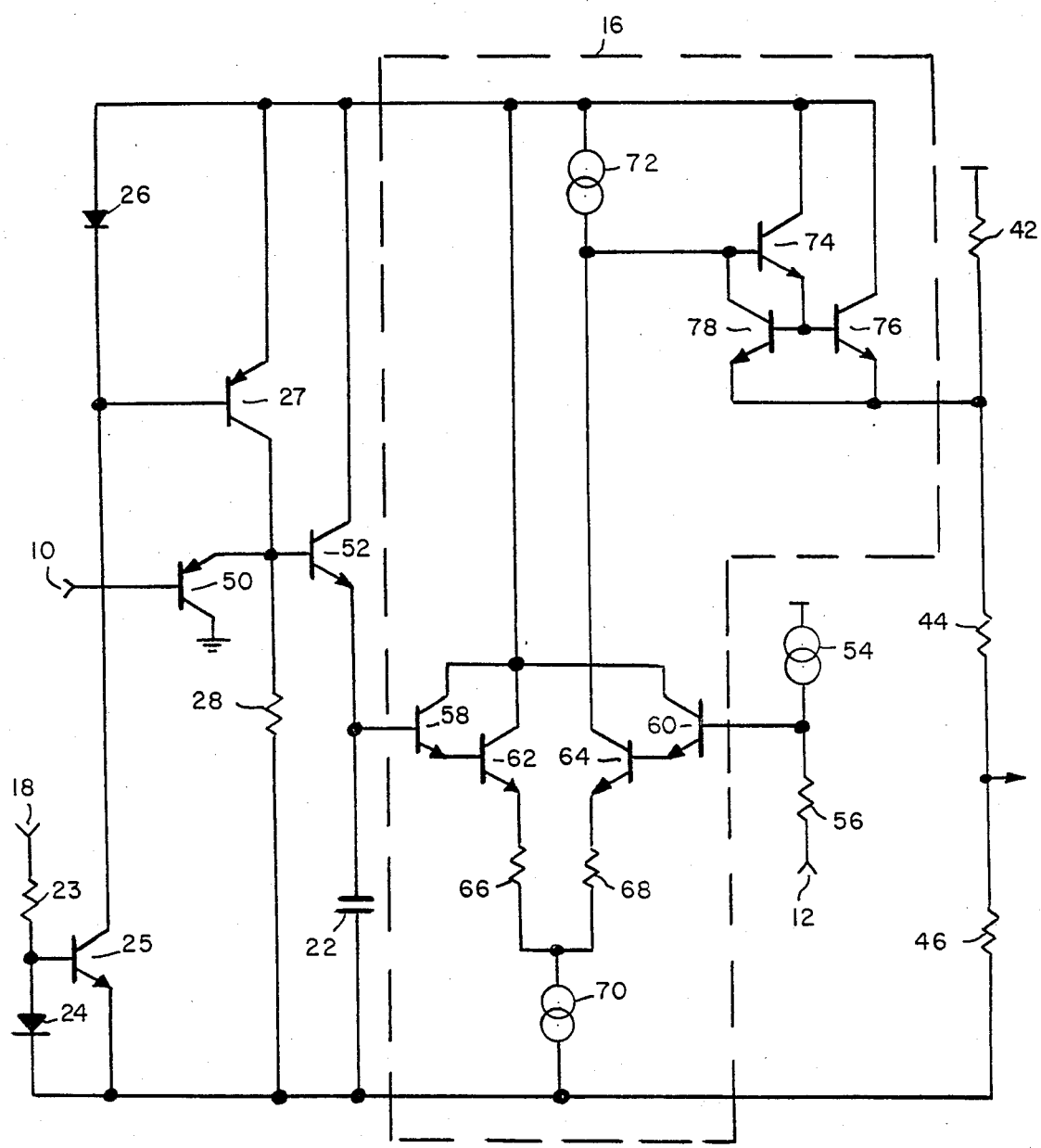
FIG. 2 is a schematic circuit diagram of the present invention.

Referring now to FIG. 2, a more detailed schematic of the circuitry of the present invention is shown. Switch 20 from FIG. 1 is formed by transistor 25, transistor 27, diode 26 and diode 24. When a signal is received from voltage clamp 18 indicating that a maximum peak current is being requested, then that signal is provided through resistor 23 to the current mirror formed by diode 24 and transistor 25. The current mirrored in transistor 25 is pulled through diode 26 and is mirrored through transistor 27. The current through transistor 27 is provided through resistor 28 which biases transistors 50 and 52 on. Transistors 50 and 52 provide a buffer between the voltage output of the current sense amplifier 10 and the input to the modulator 16. A voltage proportional to the sensed inductor current is provided by the current sense amplifier 10 to the base of transistor 50. Because of the cancelling effects of the base-emitter voltages of transistor 50 and transistor 52, the same voltage as that output by the current sense amplifier 10 appears at the input to the modulator 16. The peak output voltage from the ourrent sense amplifier 10 is held by capaoitor 22. The modulator 16 is a fixed gain differential transconductance amplifier with output current source only capability. The other input to the modulator 16 is connected to the first voltage threshold set by the output of the error amplifie 12 and a level shifting network composed of current source 54 and resistor 56. In accordance with the presently preferred embodiment, current source 54 and resistor 56 provide a voltage valued so as to add 10% to the maximum value of the voltage signal provided by error amplifier 12.

The peak output voltage from the current sense amplifier 10 is provided to the base of a transistor 58. The first voltage threshold from the error amplifier 12 is provided to the base of a transistor 60. The collectors of transistor 58 and transistor 60 are connected to one another. The emitter of transistor 58 connects to the base of a transistor 62. The emitter of transistor 60 is connected to the base of a transistor 64. The emitters of transistors 62 and 64 are connected through resistors 66 and 68, respectively, into a current source 70. A current source 72 is connected to the collector of transistor 64.

Under normal operating conditions when the maximum peak current is not being requested and the modulator is not being enabled, transistor 64 is on and all the current from current source 72 is pulled through it. When the maximum peak current signal from the voltage clamp 18 turns on the voltage signal from the current sense amplifier 10, the modulator 16 compares that voltage to the first threshold voltage at the base of transistor 60. The first threshold is 10% over the maximum voltage at the error amplifier 12 a set in the presently preferred embodiment. When the voltage at the current sense amplifier 10 is equal to the first threshold then transistors 62 and 64 are equally on. Each of them pulls the same amount of current. Current source 70 provides a current equal to double the current provided by current source 72, thus when the peak output voltage from the current sense amplifier 10 is equal to the first threshold voltage equal current is provided through transistor 62 and transistor 64 and that current is equal to the amount of current provided by current source 72.

When the voltage at the base of transistor 58 begins to exceed the first threshold voltage, the current through transistor 64 drops below the current provided by current source 72 and thus some current is provided to the current multiplier formed by transistors 74, 76 and 78. These transistors provide that current into the resistor divider network which sets the timing voltage in the timing block 30. The current provided through resistor 44 and resistor 46 raise the timing voltage so as to slow the discharging of the timing capacitor 31 and lengthen the off time of the current mode controller.

In accordance with the presently preferred, embodiment, when the voltage at the base of transistor 58 reaches a second threshold voltage which is 20% above the maximum voltage level of the error amplifier 12, the current through transistor 74, 76 and 78 is maximized so that the timing voltage rises above 2 volts thereby lengthening the off time towards infinity. It is less than infinite since capacitor 22 will eventually discharge below 4.8 volts.

In the presently preferred embodiment the voltage level of the error amplifier 12 when maximum peak current is demanded is 4 volts. Resistor 56 and current source 54 provide an additional 400 millivolts to provide a 10% margin between the maximum voltage level and the onset of the off time modulation.

Resistors 66 and 68 set the gain of the transconductance amplifier. These resistor values are selected in the presently preferred embodiment so that when the current sense amplifier 10 has a voltage exceeding the maximum voltage by 20% transistor 62 is fully on and all of the current from current source 72 is provided into the resistor divider network of resistor 42, 44, and 46. In the presently preferred embodiment, this second threshold is 4.8 volts.

Of course, it should be understood that various changes and modifications to the preferred embodiment described above will be apparent to those skilled in the art. For example, there are a number of different amplifiers which may be used to perform the function of the modulator in the present invention. Also, the selected threshold may be changed to suit the particular application. These and other changes can be made without departing from the spirit and scope of the invention and without diminishing its attendant advantages. It is therefore intended that such changes and modifications be covered by the following claims.

We claim:

1. An overcurrent timer modulator circuit comprising:
   means for receiving an output voltage from a current sense amplifier;
   means for holding the peak output voltage from said current sense amplifier;
   a timing circuit which sets an off time at a constant length of time;
   means for comparing the peak output voltage with a first threshold; and
   means for extending said off time if said peak output voltage exceeds said first threshold.

2. The overcurrent timer modulator circuit of claim 1 wherein said means for holding comprises a capacitor.

3. The overcurrent timer modulator circuit of claim 1 wherein said means for comparing comprises a differential amplifier.

4. The overcurrent timer modulator circuit of claim 1 wherein said means for extending said off time comprises at least one transistor for diverting current from said means for comparing to said timing circuit.

5. The overcurrent timer modulator circuit of claim 1 further comprising switch means for providing said output voltage from said receiving means to said holding means.

6. The overcurrent time modulator circuit of claim 5 wherein said switch means comprises:
   means for receiving a control signal when an error amplifier is requesting maximum current;
   a first transistor having a base connected to said means for receiving the oupur from said current sense amplifier and having an emitter;
   a second transistor having a base connected to the emitter of said first transistor and having an emitter connected to said holding means; and
   means for turning said first and second transistors on in response to receiving said control signal.

7. The overcurrent timer modulator of claim 1 wherein said means for extending said off time makes a maximum extension in said off time when said peak output voltage exceeds a second threshold.

8. An overcurrent timer modulator for use with a current mode controller having a current sense amplifier and an error amplifier comprising:
   means for receiving an output voltage from a current sense amplifier;
   a capacitor for holdinga voltage when the voltage reaches its peak;
   a switch for providing the output voltage from said receiving means to said capacitor in repsonse to a control signal indicating that maximum current is being requested by said error amplifier;
   a timing circuit which sets an off time at a constant length of time;
   means for comparing the voltage on said capacitor with a first threshold; and
   means for extending said off time if said voltage on said capacitor exceeds said first threshold.

9. The overcurrent timer modulator circuit of claim 8 wherein said means for comparing comprises a differential amplifier.

10. The overcurrent timer modulator circuit of claim 8 wherein said means for extending said off time comprises a current multiplier for diverting current from said means for comparing to said timing circuit.

11. The overcurrent timer modulator circuit of claim 8 wherein said switch means comprises:
    a first transistor having a base connected to said means for receiving the output from a current sense amplifier and having an emitter;
    a second transistor having a base connected to the emitter of said first trnsistor and having an emitter connected to said capacitor; and
    means for turning said first and second transistors on in response to receiving said control signal.

12. The overcurrent timer modulator of claim 8 wherein said means for extending said off time increases said off time when said peak output voltage exceeds said first threshold an wherein said increase causes said off time to approach infinity when said peak output voltage exceeds a second threshold.

13. An overcurrent timer modulator connectable to a constant off time current mode controller having a current sense amplifier and an error amplifier comprising:
    means for receiving an output voltage from said current sense amplifier;
    modulator means for producing a modulating voltage signal when the output voltage from said current sense amplifier exceeds a first threshold, said first threshold being a predetermined amount greater than a maximum voltage level from said error amplifier;
    switch means for enabling said modulator means by providing the output voltage from said receiving means to said modulator means in response to a control signal indicating that maximum current is being requested by said error amplifier;
    means for setting a timing voltage; and
    means for providing said modulating voltage signal to said means for setting said timing voltage so that the off time of said current mode controleer increases in response to said modulating voltage signal.

14. The overcurrent timer modulator circuit of claim 13 wherein said modulator means comprises a differential transconductance amplifier.

15. The overcurrent timer modulator circuit of claim 13 wherein said switch means comprises:
    a first transistor having a base connected to said means for receiving the output from said current sense amplifier and having an emitter;
    a second transistor having a base connected to the emitter of said first transistor and having an emitter connected to said modulator means; and
    means for turning said first and second transistors on in response to receiving said control signal.

16. The overcurrent timer modulator of claim 13 wherein said modulating voltage signal reaches a maximum when the output voltage from said current sense amplifier exceeds a second threshold.

17. The overcurrent timer modulator of claim 13 further comprising a capacitor for holding the output voltage from said current sense amplifier when the output voltage reaches its peak.

18. An overcurrent timer modulator for use with a current mode controller having a current sense amplifier and an error amplifier comprising:
   means for receiving an output voltage from a current sense amplifier;
   a capacitor for holding a voltage when the voltage reaches its peak;
   a switch for providing the output voltage from said receiving means to said capacitor in response to a control signal indicating that maximum current is being requested by said error amplifier;
   means for setting a timing voltage;
   means for comparing the voltage on said capacitor with a first threshold; and
   a current multiplier for diverting current from said means for comparing to said means for setting the timing voltage if said voltage on said capcitor exceeds said first threshold, said diversion of current causing a change in said timing voltage.

19. The overcurrent timer modulator of claim 18 wherein said current multiplier causes an increase in said timing voltage when said peak output voltage exceeds said first threshold and said increase causes the off time of a current mode controller to approach infinity when the peak output voltage exceeds a second threshold.

* * * * *

UNITED STATES PATENT AND TRADEMARK OFFICE
CERTIFICATE OF CORRECTION

PATENT NO. : 4,819,122
DATED : April 4, 1989
INVENTOR(S) : Walter S. Gontowski, Jr., Richard Redl, Nathan O. Sokal It is certified that error appears in the above-identified patent and that said Letters Patent is hereby corrected as shown below:

IN THE NAMED INVENTORS:

Please add: Richard Redl, Arlington, MA
Nathan O. Sokal, Lexington, MA

Column 2, line 14, please delete "1?" and insert --10--.
Column 3, line 29, please delete "lo" and insert --10--.
Column 3, line 61, please delete "capaoiter" and insert --capacitor--.
Column 3, line 66, please delete "amplifie" and insert --amplifier--.
Column 4, line 24, please delete "a" and insert --as--.

Column 5, line 42, please delete "time" and insert --timer--.
Column 5, line 47, please delete "outpur" and insert --output--.
Column 5, line 63, please delete "holdinga" and insert --holding a--.
Column 6, line 27, please delete "an" and insert --and--.
Column 6, line 51, please delete "controleer" and insert --controller--.

Signed and Sealed this
Twelfth Day of December, 1989

*Attest:*

JEFFREY M. SAMUELS

*Attesting Officer*      *Acting Commissioner of Patents and Trademarks*